(12) United States Patent
Burns

(10) Patent No.: US 7,360,963 B1
(45) Date of Patent: Apr. 22, 2008

(54) MOTORCYCLE TRIPLE CLAMP

(76) Inventor: Gregory Lee Burns, 760 Indian Trail, Gardnerville, NV (US) 89460

( * ) Notice: Subject to any disclaimer, the term of this patent is extended or adjusted under 35 U.S.C. 154(b) by 99 days.

(21) Appl. No.: 10/771,058

(22) Filed: Feb. 2, 2004

Related U.S. Application Data

(60) Provisional application No. 60/444,267, filed on Jan. 31, 2003.

(51) Int. Cl.
*F16B 1/00* (2006.01)
*B62K 21/00* (2006.01)
*B62K 21/06* (2006.01)

(52) U.S. Cl. ...................... 403/177; 280/279

(58) Field of Classification Search ........... 403/177, 403/191, 234, 235, 351, 352, 396, 398; 280/219, 280/274, 278–280, 281.1, 287, 775, 785; 180/210, 218, 311; 74/551.3, 551.6; 384/255
See application file for complete search history.

(56) References Cited

U.S. PATENT DOCUMENTS 3,342,507 A * 9/1967 Koch et al. ............ 280/86.754
3,866,946 A * 2/1975 Robison ..................... 280/279
5,404,769 A * 4/1995 Kao ........................... 74/551.3
5,938,225 A * 8/1999 Scheibe et al. ............. 280/279
5,967,538 A * 10/1999 Callaluca et al. ........... 280/279
6,783,158 B2 * 8/2004 Nakagawa et al. .......... 280/785
2005/0223842 A1 * 10/2005 Dube et al. ............... 074/551.1

FOREIGN PATENT DOCUMENTS

DE 39 33 058 A1 * 4/1991 ................ 180/219

* cited by examiner

*Primary Examiner*—Katherine Mitchell
*Assistant Examiner*—Ruth C. Rodriguez
(74) *Attorney, Agent, or Firm*—A. D. Gathy

(57) ABSTRACT

The disclosure describes a triple clamp. The triple clamp includes a body defining a first fork clamp opposite a second fork clamp along a fork centerline. The body defines a center steering pivot. The center steering pivot includes a pivot centerline. An offset is defined by the fork centerline and the pivot centerline. At least one clamp insert has an eccentric form insertable in each of the first fork and the second fork. The clamp insert is configured to shift the offset.

13 Claims, 4 Drawing Sheets

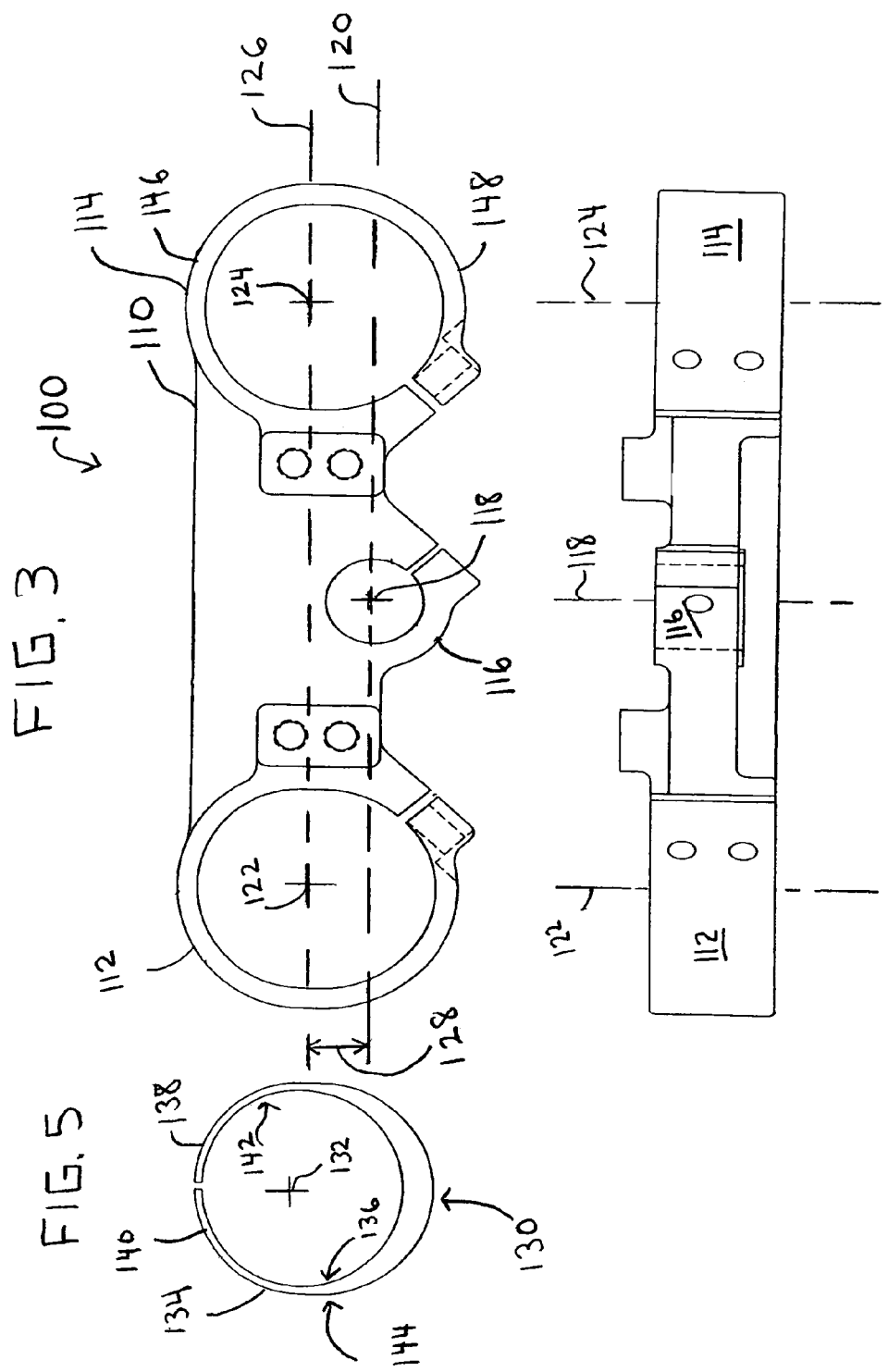

MOTORCYCLE TRIPLE CLAMP

PRIORITY

This application claims priority to Provisional Patent Application No. 60/444,267 filed on Jan. 31, 2003.

BACKGROUND

The disclosure relates to high performance motorcycle components, and more particularly to a triple clamp for a motorcycle and other two-wheeled vehicles.

A motorcycle is equipped with a front end steering system including a front tire mounted to two front forks. The front forks are connected to handle bars. The front forks attach to the frame of the motorcycle with a triple clamp. The triple clamp comprises an upper triple clamp and a lower triple clamp. In each of the upper and lower triple clamps, a clamp or mount for each of the two front forks as well as a center steering pivot is provided. The center steering pivot is for mounting the front steering system to the frame via a pivot, typically a shaft. The handle bars couple to the upper triple clamp at handle bar mounting holes.

The front steering system functions through control commands to the handle bars that rotate the forks, triple clamps and wheel about the center pivot in a rotary manner. The capability for the front steering system to turn the motorcycle in a sharp turn as well as keep the motorcycle stable along a straight path at high speeds is of paramount importance.

Prior art motorcycle front steering systems have attempted to provide both the sharp turning capability and high-speed stability. The predominant means of providing the above features is to vary the relationship between the front forks and the center steering pivot. By altering the relationship between the front forks and the center steering pivot, the performance characteristics can be altered. Further detail must be provided in order to explain the alterations.

The relationship of the location of the front forks to the center steering pivot creates a variation in the steering response of the motorcycle. Referring to Prior Art FIG. 1, the upper triple clamp 10 is shown from a top view. The triple clamp 10 has a body 12 that includes a first fork clamp 14 and a second fork clamp 16 at opposite ends of the body 12. A center steering pivot 18 is defined in the body 12 between the first and second fork clamp 14, 16. A center steering pivot 18 centerline is shown as a dashed line 20 that bisects the center of the center steering pivot center 18. Another dashed line 22 represents the centerline of the fork clamps 14, 16. In FIG. 1, the line 22 is shown as offset 24 from line 20. The fork clamps 14, 16 are offset from the center steering pivot 18. Adjustment of the offset 24, results in performance changes in the steering system of the motorcycle.

The prior art devices have altered the offset 24 by manufacturing the triple clamp 10 with preset and fixed offsets 24. In order to adjust the steering system, for example to tune the steering for a race course with straight fast portions, the motorcycle would have to be placed in a shop or garage. The steering system would then be disassembled taking apart the steering system down to removal of the triple clamps from the frame. Replacement triple clamps would be installed and the entire steering system reassembled. This procedure is time consuming and is not easily done in the field, if at all.

Another relationship of the angle of the front forks and the center steering pivot creates a variation in the steering response of the motorcycle. Referring to Prior Art FIG. 2, a schematic of the motorcycle front wheel is illustrated. The motorcycle front wheel 30 contacts the surface of the ground at a ground contact patch 32. The extension of the center steering pivot along an imaginary line, called the steering pivot line 34, intersects the ground at a steering axis point 36. The dimension between the ground contact patch 32 and the steering axis point 36 is called the trail 38. The trail 38 influences the turning characteristics of two wheeled vehicles, such as motorcycles. The dimension between the steering pivot line 34 and the vertical centerline 40 of the wheel 30 is called the fork rake angle 42. As the rake angle 42 is varied, the trail 38 is varied. Another technique to vary the turning characteristics of the motorcycle is to vary the fork rake angle 42 thus varying the trail 38. Prior art techniques of altering the fork rake angle 42 are equally as cumbersome as the above described modifications to the offset.

What is needed in the art is an improved triple clamp that allows for easy adjustment of the steering system to customize and enhance the steering performance.

SUMMARY

The disclosed device is directed toward a triple clamp. The triple clamp includes a body defining a first fork clamp opposite a second fork clamp along a fork centerline. The body defines a center steering pivot. The center steering pivot includes a pivot centerline. An offset is defined by the fork centerline and the pivot centerline. At least one clamp insert has an eccentric form insertable in each of the first fork and the second fork. The clamp insert is configured to shift the offset.

Another embodiment is directed towards a triple clamp comprising a clamp body forming a first fork clamp and a second fork clamp. A center steering pivot is formed in the clamp body between the first fork clamp and the second fork clamp. The center steering pivot defines a steering centerline. The first and second fork clamps define a fork centerline. An offset is formed between the steering centerline and the fork centerline. A clamp insert comprises an insert body defining an insert wall defining an insert inside diameter and an insert outside diameter. The clamp insert outside diameter is configured to be insertable in each of the first fork clamp and the second fork clamp and is configured to shift the offset.

A method of using a triple clamp is disclosed. The method includes installing a set of triple clamps on a motorcycle frame. The set of triple clamps include an upper triple clamp and a lower triple clamp. The upper triple clamp and the lower triple clamp each comprise a body defining a first fork clamp opposite a second fork clamp along a common centerline. The body defines a center steering pivot. The center steering pivot includes a pivot centerline. An offset is defined by the common centerline and the pivot centerline. The method includes inserting an upper set of clamp inserts in the upper triple clamp. Each of the upper clamp inserts have an eccentric form insertable in each of the first and second forks of the upper triple clamp. The upper clamp insert is configured to shift the offset of the upper triple clamp. The method includes inserting a lower set of clamp inserts in the lower triple clamp. Each of the lower clamp inserts have an eccentric form insertable in each of the first and second forks of the lower triple clamp. The lower clamp insert is configured to shift the offset of the lower triple clamp. The method includes shifting the offset of the upper triple clamp and the lower triple clamp.

BRIEF DESCRIPTION OF THE DRAWINGS

FIG. 3 is a top view of an exemplary triple clamp.
FIG. 4 is a front view of an exemplary triple clamp.
FIG. 5 is a top view of an exemplary clamp insert.

DETAILED DESCRIPTION

Figure 1:
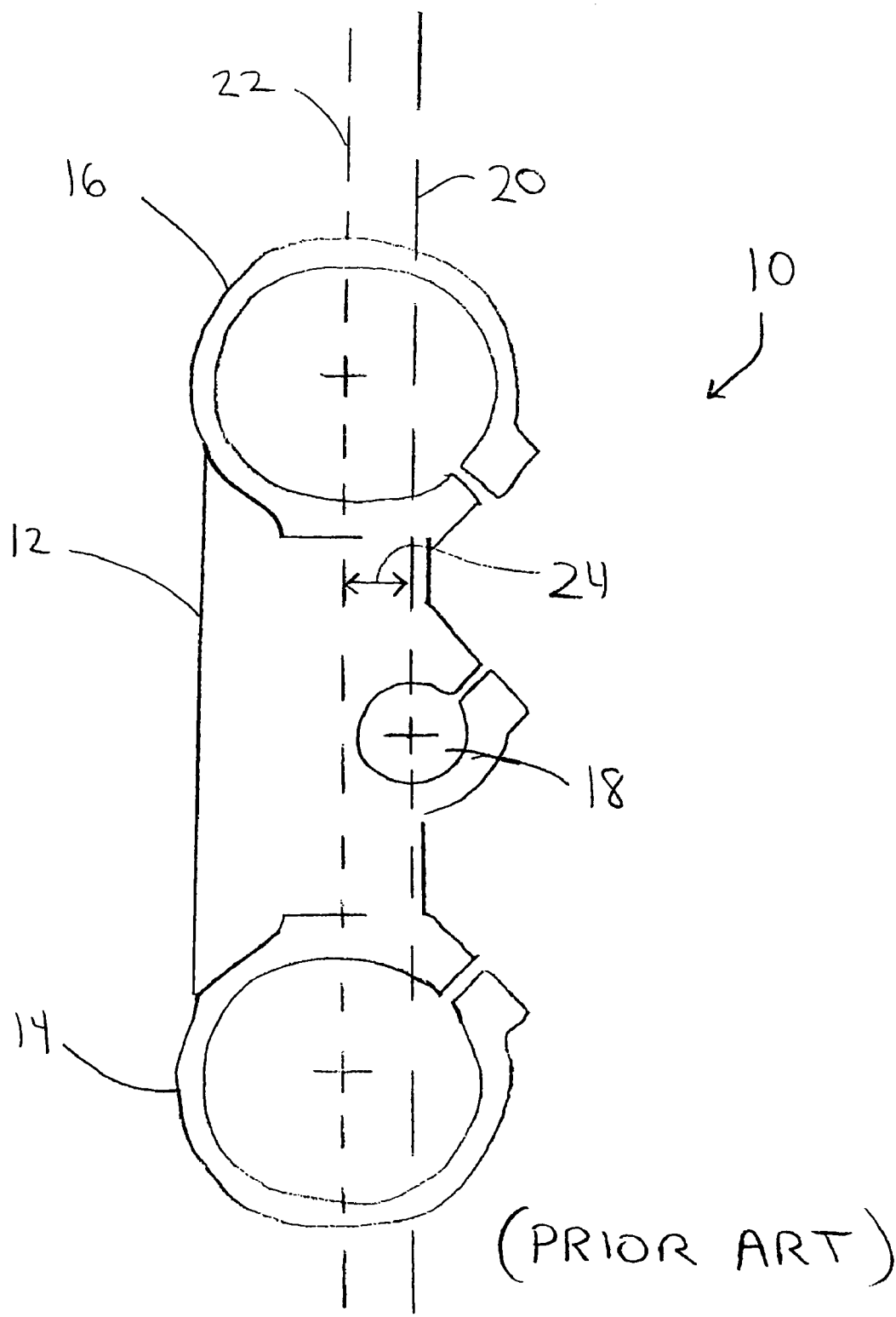
FIG. 1 is an illustration of an exemplary prior art triple clamp.

The disclosed device is an adjustable triple clamp. The adjustable triple clamp includes a body having a first fork clamp and a second fork clamp. A center steering pivot is formed in the body between the first fork clamp and the second fork clamp. The center steering pivot defines a steering centerline. The first fork clamp and the second fork clamp define a fork clamp centerline. The steering centerline and the fork clamp centerline form an offset. A first clamp insert having a first clamp insert body is adjustably insertable in the first fork clamp. A second clamp inset having a second clamp insert body is adjustably insertable in the second fork clamp. By inserting the first and second clamp inserts into the first and second fork clamps respectively, the fork clamp centerline is shifted. Each clamp insert has an interior surface that can be formed to create an eccentric center point. The interior surface is configured to shift the offset between the steering centerline and the fork centerline. The clamp inserts can also be employed to shift a trail.

Referring to FIGS. 3, 4 and 5, a triple clamp is illustrated in a top and front view, and an insert is illustrated in a top view. The triple clamp 100 includes a clamp body 110 having a first fork clamp 112 and a second fork clamp 114 formed in the clamp body 110 at opposite ends. The clamp body 110 defines a center steering pivot 116. The center steering pivot 116 includes a steering center 118 with a steering centerline 120. The steering centerline 120 is shown as a dashed line 120. The fork clamps 112 and 114 also define a fork center 122, 124 respectively. A common centerline (or fork centerline) 126 traces through both fork centers 122, 124. The dimension separating the steering centerline 120 of the center steering pivot 116 and the fork centerline 126 of the two fork clamps 112, 114 defines an offset 128.

The triple clamp 100 is one of a set of two triple clamps 100 that are installed on a two-wheeled vehicle, such as a motorcycle (not shown). The triple clamp 100 is used to mount the handlebars (not shown) and front wheel (not shown) to the motorcycle frame (not shown) at the center steering pivot 116. The triple clamp 100 supports forks (not shown) inserted into the first and second fork clamps 112, 114. The forks support the front wheel (not shown). As discussed above, by varying the offset 128, the steering characteristics of the front wheel and motorcycle can be altered and enhanced. The disclosure provides for a means to shift the offset 128 with a set of clamp inserts 130.

Clamp inserts 130 are insertable into the first fork clamp 112 and the second fork clamp 114. A clamp insert 130 can also be inserted into the center steering pivot 116 in alternative embodiments. The clamp insert 130 is formed with an insert center 132. In an exemplary embodiment the clamp insert 130 can be formed with an eccentric insert center 132 relative to an exterior perimeter 134 of the clamp insert 130. The clamp insert 130 is insertable within the fork clamps 112, 114 or center steering pivot 116. The clamp insert 132 shifts the actual fork centers 122, 124 of the fork clamps 112, 114. By shifting the actual fork centers 122, 124 of the fork clamps 112, 114, the fork centerline 126 is shifted. By shifting the fork centerline 126 relative the steering centerline 120, the offset 128 is changed in the triple clamp 100. The actual fork centers 122, 124 of the fork clamps 112, 114 becomes the insert center 132 of the clamp insert 130 relative to an inner surface 136 of the clamp insert 130. A front fork (not shown) is insertable in the clamp insert 130 and coupled to the inner surface 136. When the insert center 132 is eccentric, the front fork inserted into the clamp insert 130 is shifted relative to the center steering pivot 116. The steering characteristics of a vehicle having the triple clamp 100 are altered as a result of the shift in the offset 128. The dimensions of the clamp insert 130 are capable of being preformed to any variety of eccentricity or concentricity. The insert perimeter 134 is formed to mate within the fork clamps 112, 114. The inner surface 136 of the clamp insert 130 is formed to mate with the outside diameter of a fork (not shown).

Specifically, the clamp insert 130 includes an insert body 138 having an insert wall defining an insert inside diameter 142 and an insert outside diameter 144. The insert outside diameter 144 is equal to the insert perimeter 134. The insert wall 140 has a variable wall thickness 146. An insert slot 148 is formed in the insert wall 140. The insert slot 148 is configured to allow for insert wall 140 to flex for maintaining a tight hold on a fork (not shown) mounted in the clamp insert 130.

The insert wall thickness 146 can be varied such that the insert center 132 is eccentric relative to the insert perimeter 134. In other embodiments, the insert center 132 can be concentric, and the insert wall thickness 146 formed constant. The insert perimeter 134 can be oval in shape to mate with an oval shaped first fork clamp 112 and second fork clamp 114. Although the shape of the fork clamps 112, 114 and insert perimeter can be non-oval, round, square, and the like.

The clamp insert 130 has a reversible feature that allows the clamp insert to be inserted in two ways, thus having a reversible feature. The reversible feature is configured to create a first shift in the offset and a second shift in the offset. The clamp insert 130 can be inserted in a first offset configuration having the thickest insert wall portions proximate a front 146 of the fork clamp 112, 114 or inserted in a second offset configuration having the thickest insert wall 140 portions proximate a rear 148 of the fork clamp 112, 114. The clamp insert 130 is capable of being rotated (or reversed) in a manner that allows for two different shifts of the offset 128 with one style of clamp insert 130. The offset 128 can be shifted forward or rearward relative to the clamp body 110 with the same clamp insert 130. The clamp insert 130 can be removed, rotated, and then reinserted. A variety of clamp inserts 130 each having varying insert wall 140 dimensions and variance in eccentricity, can be utilized to shift the offset 128 on the triple clamp 100. In an exemplary embodiment, when the insert perimeter 134 is oval-shaped to match the oval shape of the fork clamps 112, 114, and the clamp insert 130 has an eccentric insert center 132, the clamp insert 130 can be rotated 180 degrees to create two different shifts in the offset 128. In an exemplary embodiment, the clamp insert 130 can be formed to have the capacity to provide about a 14 millimeter (mm) and about a 20 mm offsets, about 16 mm and about 18 mm offsets, and even a zero offset. The reversible feature can provide the capacity to rotate the clamp insert 130 to provide the two different offsets 128 from one clamp insert 130. In another exemplary embodiment, the clamp insert 130 can be formed to provide a dead center, concentric no shift in the offset 128.

In an exemplary embodiment, a clamp insert 130 can be inserted into the center steering pivot 116. The clamp insert 132 can be disposed in the center steering pivot 116 and can shift the offset 128.

Variation in the dimensions of the clamp insert 132 allows for variation in the offset 128. The procedure to replace the clamp insert 130 is far less time consuming and requires no special maintenance facility. The triple clamp 100 does not have to be removed from the frame of the motorcycle. A user can have available different clamp inserts 130 to adjust the offset 128 in the field, if necessary.

Figure 2:
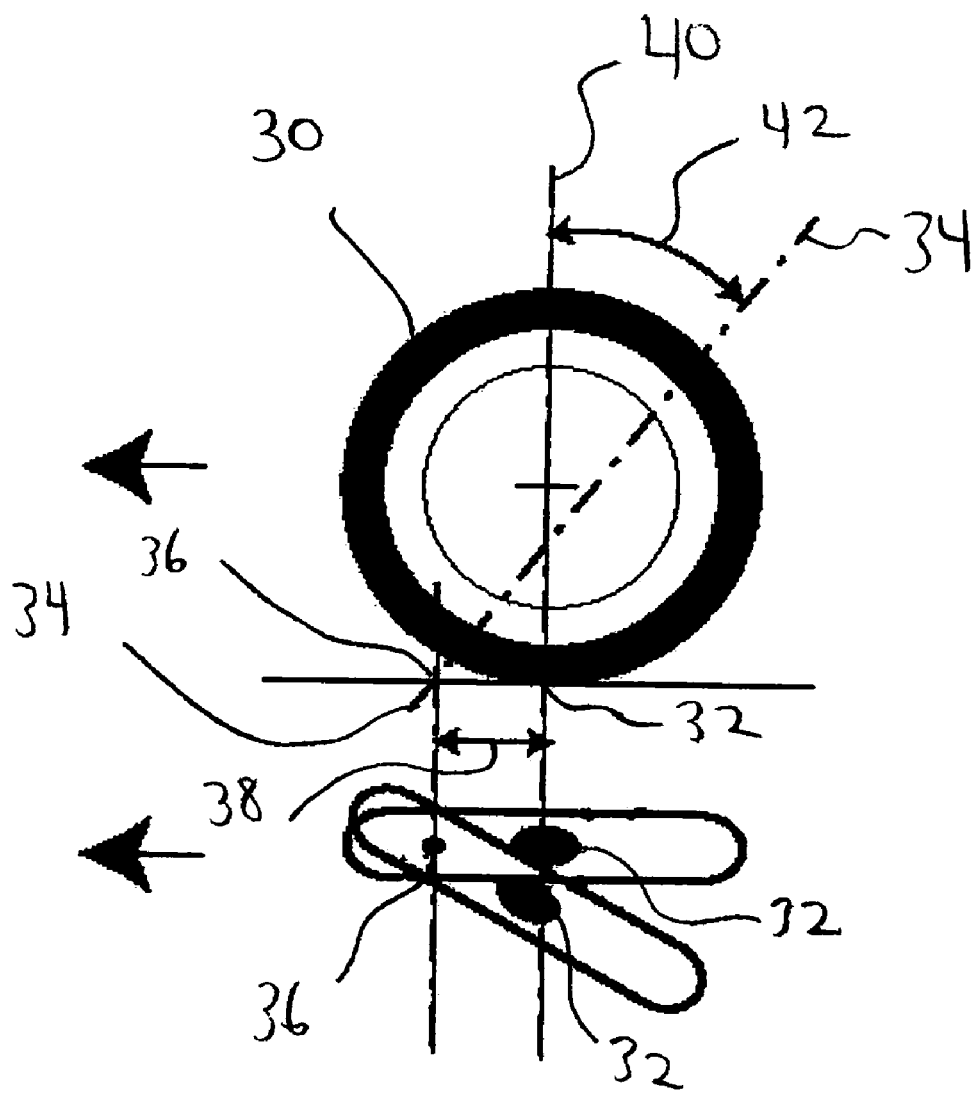
FIG. 2 is a schematic illustration of an exemplary wheel.
Figure 6:
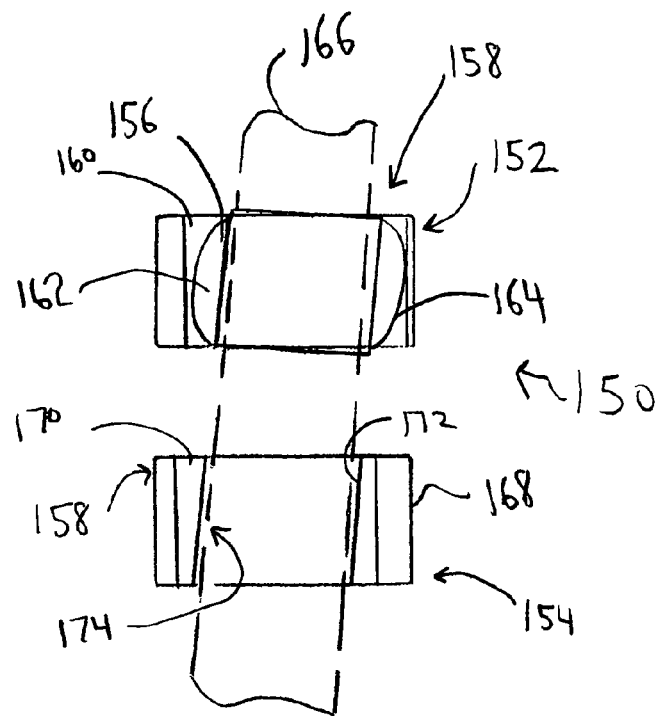
FIG. 6 is a side view of an exemplary triple clamp pair.
Figure 7:
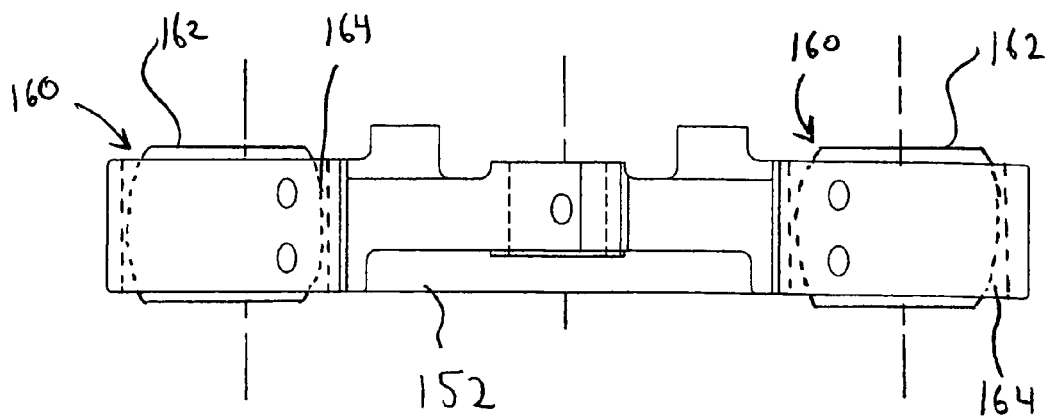
FIG. 7 is a front view of an exemplary triple clamp.

Referring to FIGS. 6 and 7, a side view and a front view of an exemplary triple clamp is illustrated. FIG. 6 illustrates a pair of triple clamps 150. The pair of triple clamps 150 comprises an upper triple clamp 152 and a lower triple clamp 154. The upper triple clamp 152 includes a ball clamp insert 156 disposed in the fork clamps 158 of the upper triple clamp 154. The ball clamp insert 156 comprises a ball clamp body 160 having a ball insert 162 disposed in a ball cavity 164. A fork 166 is shown in dashed lines disposed through the ball insert 162. The ball clamp insert 156 is configured to couple the fork 166 in the upper triple clamp 150 and alter the fork rake angle 42 (see FIG. 2) of the fork 166. The ball insert 162 is configured to rotate and swivel within the ball cavity 164, similar to a ball joint.

The lower triple clamp 154 comprises a clamp body 168 having an angled clamp insert 170. The angled clamp insert 170 comprises an inner surface 172 that is formed with an angle or pitch 174 along the axis of the angled clamp insert 170. The pitch 174 corresponds to a predetermined fork rake angle. The angled clamp insert 170 can have a variety of pitches 174. The angled clamp insert 170 also includes the same eccentric clamp wall properties as in the embodiments discussed above, allowing the fork 166 to shift in the fork clamps 158.

The pair of triple clamps 150 can employ any combination of the ball clamp insert 156, and the angled clamp insert 170 to vary the fork rake angle of the fork 166.

In use, the exemplary triple clamp can be used to alter the offset in the triple clamp. Front forks mounted in the triple clamp pair can be shifted forward and rearward to customize the steering characteristics of the steering system of a motorcycle or other two-wheeled vehicle. The clamp inserts employed can include the capacity to reverse and create two variable shifts in the offset. A set of preformed clamp inserts can be carried along with the triple clamps in the racing arena. The rider can employ the variety of clamp inserts to rapidly alter the offset in the steering. The ride can customize the offset based on the track conditions and the desired effects. The need to completely break down the steering mechanism on a motorcycle is no longer needed. A field modification with the inventive triple clamp and clamp inserts can accomplish hours of shop work from prior art techniques. The motorcycle steering characteristics can be modified in the field improving the rider's capacity to ride on any given track or terrain.

The use of the ball fork clamps can also improve the steering characteristics as in the above embodiment. The ball fork clamps can alter the fork rake angle, and thus, alter the steering characteristics of the vehicle. Similar field modifications are also well within the capacity of the ball fork clamps. A variety of ball clamp inserts having varied angled designs can be carried to the field. The rider can modify the steering characteristics by easily inserting any combination of clamp inserts to shift the offset and/or fork rake angle.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. A motorcycle triple clamp comprising:
   a body defining a first motorcycle fork clamp opposite a second motorcycle fork clamp along a common centerline, said body defining a motorcycle center steering pivot, said motorcycle center steering pivot including a pivot centerline;
   an offset defined by said common centerline and said pivot centerline;
   at least one clamp insert having an eccentric form insertable in each of said first motorcycle fork clamp and said second motorcycle fork clamp, said clamp insert configured to shift said offset of a motorcycle;
   an additional body defining a third motorcycle fork clamp opposite a fourth motorcycle fork clamp along an additional common centerline; and
   at least one ball clamp insert having a ball clamp body forming a ball cavity supporting a ball insert, said ball clamp insert insertable in each of said third motorcycle fork clamp and said fourth motorcycle fork clamp.

2. The motorcycle triple clamp of claim 1 wherein said at least one clamp insert comprises an insert body having an insert wall, said insert wall defining an insert perimeter and an insert inside diameter, said insert wall having a variable thickness, said variable thickness configured to shape said eccentric form.

3. The motorcycle triple clamp of claim 1 wherein said at least one clamp insert is configured to be insertable in said motorcycle center steering pivot.

4. The motorcycle triple clamp of claim 2 wherein said insert perimeter is configured to dispose in each of said first motorcycle fork clamp and said second motorcycle fork clamp.

5. The motorcycle triple clamp of claim 1 wherein said at least one clamp insert comprises a reversible feature, wherein said reversible feature is configured to create a first shift in said offset and a second shift in said offset.

6. The motorcycle triple clamp of claim 5 wherein said at least one clamp insert is configured to shift said offset in one of forward and rearward relative to said motorcycle center steering pivot.

7. The motorcycle triple clamp of claim 2 wherein said clamp insert perimeter is configured to be insertable in said motorcycle center steering pivot to shift said offset.

8. The motorcycle triple clamp of claim 1 wherein said ball clamp insert is configured to alter a fork rake angle.

9. The motorcycle triple clamp of claim 1 wherein said at least one clamp insert comprises an angled clamp insert having an inner surface formed with a pitch along the axis of the angled clamp insert.

10. The motorcycle triple clamp of claim 9 wherein said pitch corresponds with a predetermined fork rake angle.

11. A method of using a triple clamp comprising:
    installing a set of triple clamps on a motorcycle frame, said set of triple clamps comprising an upper triple clamp and a lower triple clamp, said upper triple clamp and said lower triple clamp each comprising a body defining a first fork clamp opposite a second fork clamp along a common centerline, said body defining a center steering pivot, said center steering pivot including a pivot centerline, an offset defined by said common centerline and said pivot centerline;

inserting an upper set of clamp inserts in said upper triple clamp, each said upper clamp insert having an eccentric form insertable in each of said first and second forks of said upper triple clamp, said upper clamp insert configured to shift said offset of said upper triple clamp;

inserting a lower set of clamp inserts in said lower triple clamp, each said lower clamp insert having an eccentric form insertable in each of said first and second forks of said lower triple clamp, said lower clamp insert configured to shift said offset of said lower triple clamp; and shifting said offset of said upper triple clamp and said lower triple clamp.

12. The method of claim 11 further comprising:
reversing said upper set of clamp inserts;
reversing said lower set of clamp inserts;
creating a first offset; and creating a second offset.

13. The method of claim 11 further comprising:
replacing said upper set of clamp inserts with an upper set of ball clamp inserts, said ball clamp inserts comprising a ball clamp body forming a ball cavity supporting a ball insert, said ball clamp inserts configured to alter a fork rake angle;
replacing said lower set of clamp inserts with a lower set of angled clamp inserts, said angled clamp inserts comprising an inner surface formed with a pitch along the axis of the angled clamp insert; and
altering said fork rake angle.

* * * * *